(12) United States Patent
Todd

(10) Patent No.: US 6,858,196 B2
(45) Date of Patent: Feb. 22, 2005

(54) METHOD AND APPARATUS FOR CHEMICAL SYNTHESIS

(75) Inventor: Michael A. Todd, Phoenix, AZ (US)

(73) Assignee: ASM America, Inc., Phoenix, AZ (US)

( * ) Notice: Subject to any disclaimer, the term of this patent is extended or adjusted under 35 U.S.C. 154(b) by 302 days.

(21) Appl. No.: 10/197,899

(22) Filed: Jul. 16, 2002

(65) Prior Publication Data

US 2003/0017092 A1 Jan. 23, 2003

Related U.S. Application Data

(60) Provisional application No. 60/306,534, filed on Jul. 19, 2001.

(51) Int. Cl.⁷ ............................................. C01B 33/04
(52) U.S. Cl. ...................... 423/347; 423/344; 204/164; 204/165
(58) Field of Search ................................ 423/347, 344; 204/164, 165

(56) References Cited

U.S. PATENT DOCUMENTS

| | | | |
|---|---|---|---|
| 4,568,437 A | * 2/1986 | Dickson, Jr. ................ 204/164 |
| 4,698,218 A | * 10/1987 | Belot et al. ................ 423/347 |
| 4,792,460 A | 12/1988 | Chu et al. ...................... 427/35 |
| 4,950,373 A | * 8/1990 | Sundermeyer et al. ...... 204/164 |
| 5,478,453 A | * 12/1995 | Bernard et al. ............. 204/165 |
| 5,505,913 A | 4/1996 | Bernard et al. ........ 422/186.04 |
| 6,027,705 A | 2/2000 | Kitsuno et al. ............. 423/347 |

FOREIGN PATENT DOCUMENTS

| | | |
|---|---|---|
| JP | 60-141613 | 7/1985 |
| JP | 60-251114 | 12/1985 |
| JP | 60-255612 | 12/1985 |
| JP | 60-260418 | 12/1985 |
| JP | 62-132720 | 6/1987 |
| JP | 62-132721 | 6/1987 |
| JP | 01-198631 | 8/1989 |
| JP | 02-184513 | 7/1990 |
| JP | 03-183613 | 8/1991 |
| JP | 03-183614 | 8/1991 |
| JP | 05-032785 | 2/1993 |

OTHER PUBLICATIONS

N.N. Greenwood and E.A. Earnshaw, Chemistry of the Elements, pp. 388–390, no date.

Spanier, E.J. and MacDiarmid, A.G., "The Conversion of Silane to Higher Silanes in a Silent Electric Discharge," Inorganic Chemistry, 432–433 (1962), no month.

* cited by examiner

Primary Examiner—Ngoc-Yen Nguyen
(74) Attorney, Agent, or Firm—Knobbe Martens Olson & Bear LLP

(57) ABSTRACT

An apparatus is provided for synthesis and collection of higher order chemical compounds from lower order precursors. The apparatus includes a first silent electric discharge reactor configured to synthesize an intermediate product (e.g., disilane) from a precursor chemical (e.g., monosilane). A second silent electric discharge reactor is connected downstream of the first reactor. This second reactor is configured to convert the intermediate product into the higher order chemical compound (e.g., trisilane). Multiple condensation traps are also connected to receive effluent from the second reactor, which will generally include the compound of interest as well as unreacted precursor and intermediate product. In the illustrated embodiment, a parallel second condensation traps is also included to shunt flow and continue collection while the chemical of interest is removed for purification. Moreover, parallel second condensation traps for the intermediate product and unreacted (or recombined) precursor allow continued collection while the contents of the first traps are recycled in the reactor(s).

9 Claims, 4 Drawing Sheets

METHOD AND APPARATUS FOR CHEMICAL SYNTHESIS

REFERENCE TO RELATED APPLICATION

This application claims the priority benefit under 35 U.S.C. §119(e) to U.S. provisional patent application No. 60/306,534, filed Jul. 19, 2001 of Michael A. Todd, entitled METHOD AND APPARATUS FOR CHEMICAL SYNTHESIS.

FIELD OF THE INVENTION

The invention relates to the field of large scale, commercial volume synthetic chemistry. It relates more specifically to the synthesis of trisilane, $Si_3H_8$, as well as to other higher order silicon hydrides ($Si_nH_{2n+2}$), related higher order silane chemical derivatives and polygermanes ($Ge_nH_{2n+2}$). Trisilane and other higher order silane chemical derivatives are likely to be useful as chemical precursors for film deposition within the semiconductor industry.

BACKGROUND OF THE INVENTION

The synthesis of higher order silanes, $Si_nH_{2n+2}$ (where $n \geq 3$), has been accomplished through many synthetic approaches. These include: (1) treatment of metal silicides that contain ionic silicon-metal bonds with protonic reagents such as aqueous acids; (2) reaction of protonic reagents such as $NH_4Br$ in liquid ammonia; (3) reduction of chlorosilanes, $Si_nCl_{2n+2}$ (n=2–3), with hydridic reagents such as LiH, NaH, $NaBH_4$, $LiAlH_4$, etc . . . ; (4) reduction of silicon using hydrogen sulfide or a metal sulfide catalyst; (5) reaction between a silicon-oxygen compound containing Si—H or Si—Si bonds and a hydride, an alkoxide or an amalgam of an alkali metal; (6) reaction of higher order partially halogenated silanes and alkalai metal silyl salts; (7) electric discharge in monosilane gas mixtures' (8) dehydrogenation condensation of hydrosilanes using a platinum-group metal complex or Lanthanide-group metal compounds as a catalyst; and (9) pyrolysis of monosilane and higher order silanes with and without catalysts.

The majority of these synthetic methods suffer from numerous problems that will have to be solved before cost-effective, safe commercial synthesis of these valuable compounds can be achieved.

The use of aqueous acid solutions results in limited yields due to hydrolysis of the products as they are formed. This results in the production of large quantities of monosilane and low yields of higher order silanes. Liquid ammonia syntheses of this nature are more effective due to elimination of these hydrolysis reactions, but commercial-scale synthetic reactions are difficult to implement. See N. N. Greenwood and E. A. Earnshaw, Chemistry of the Elements (199*).

The use of hydrogen sulfide or a metal sulfide as a catalyst is problematic from safety and final product purity considerations. That is, hydrogen sulfide is a highly toxic, high-pressure gas and it is difficult to separate it from higher order silane compounds.

Reduction reactions of higher order chlorosilanes, $Si_nCl_{2n+2}$, are highly effective on a laboratory scale, but the starting chlorine compounds are difficult to synthesize and expensive. These reactions typically involve the combination of highly flammable ether solvents and flammable hydridic reducing agents and can be difficult to control when synthesizing on larger scales. Furthermore, the reactions can be very dangerous from the perspective of fire hazards and the separation of the desired silane compound(s) from the solvent and byproducts can be difficult.

Reactions involving silicon-oxygen compounds that contain Si—H or Si—Si bonds and a hydride, an alkoxide or an amalgam of an alkali metal, an alkali metal or alkali metal hydride require the handling of large amounts of hazardous chemicals. The combination of chemicals required presents a severe fire hazard during synthesis, particularly on a commercial scale.

Reaction of partially halogenated higher order silanes and alkali metal silyl salts requires costly synthetic intermediates and involves the use of highly reactive chemicals in ether solvents. As a result, this method presents serious fire hazard issues.

Prior art electric discharge methods that rely upon the use of monosilane and reduced pressure processes are expensive and typically result in low yields of higher order silanes, $Si_nH_{2n+2}$ (n>2), with a large percentage of the starting materials being converted to amorphous hydrogenated silicon particles. More recently, an effective method for converting monosilane into disilane using silent electric discharge has been demonstrated, but trisilane was the only observed higher order silane and only in very low yield (around 1%). See U.S. Pat. No. 5,505,913.

U.S. Pat. No. 4,792,460 discloses the production of polysilanes and polygermanes, including disilane and digermane, using electric discharge methods for use in in-situ deposition reactions for amorphous hydrogenated materials. This prior art reference discloses the use of atmospheric, and higher, pressure discharge reactions to generate mixtures of polysilanes and polygermanes from monosilane and monogermane expressly for the purpose of using them in in-situ deposition reactions that do not require isolation of the chemical species. This method precludes use of pure polysilanes or polygermanes, particularly liquids (i.e., $Si_nH_{2n+2}$ where $n \geq 3$ and $Ge_nH_{2n+2}$ where $n \geq 2$), in deposition reactions and further limits the application of the mixtures obtained to atmospheric pressure. The apparatus employed does not allow isolation, purification and collection of the higher order polysilanes and polygermanes.

In the catalytic methods of the prior art, the catalytic activity of the platinum-group and Lanthanide compounds is typically low, the reactions require extended periods of time and the yield of the desired higher order silanes is typically low. Furthermore, the cost of the starting materials of these reactions is typically high and contamination of the final products with unwanted metal impurities can be a serious issue.

Methods of producing higher order silanes from the pyrolysis of monosilane (see U.S. Pat. No. 6,027,705) are effective in producing a broad range of higher order silanes. These are formed as a liquid mixture that must be distilled to isolate the desired product(s) from one another. Traditional distillation techniques require heating of the mixture, resulting in the thermal decomposition of higher order silanes during the distillation. Furthermore, the method requires multiple, lengthy reaction steps, is not overly efficient and requires a complex apparatus. As a result, the commercial maturity of this technique is not sufficient to provide large quantities of pure, higher order silanes.

The lack of an efficient, safe and cost effective method for synthesizing, isolating and purifying higher order polysilanes and polygermanes, with a high degree of purity and on an industrial scale, hinders their use in semiconductor processes. As a result, there remains a need for such a process.

SUMMARY OF THE INVENTION

In accordance with one aspect of the invention, an apparatus is provided for synthesis and collection of higher order chemical compounds from lower order precursors. The apparatus includes a first silent electric discharge reactor configured to synthesize an intermediate product from a precursor chemical. A source of the precursor chemical is connected upstream of the first reactor. A second silent electric discharge reactor is connected downstream of the first reactor. This second reactor is configured to convert the intermediate product into the higher order chemical compound. Multiple condensation traps are also connected to receive effluent from the second reactor.

In accordance with another aspect of the invention, silicon precursors are fed into a discharge reactor, wherein the silicon precursors are broken down and recombined to produce higher order silanes. The products of the discharge reactor are fed to a downstream series of condensation traps, which recover a higher order silane (e.g., trisilane) in one trap and lower order silanes (e.g., silane and disilane) in another trap or traps. The higher order silane is periodically removed to a storage device. Optionally, the lower order silanes are also periodically recovered and recycled for further reactions producing the higher order silane.

In the illustrated embodiment, a series of parallel condensation traps are employed to facilitate continuous operation. Accordingly, while byproducts recovered in a first lower order condensation trap are being recycled, a second lower order condensation trap, arranged in parallel with the first lower order condensation trap, is employed to recover byproducts from the ongoing reactions. Preferably, separate condensation traps are provided for recovering disilane and monosilane. Additionally, once a higher order condensation trap has been sufficiently filled, flow from ongoing reactions in the upstream silent electric discharge reactor(s) is shunted to a second higher order silane condensation trap, while products in the first higher order silane condensation trap are removed to a storage device, preferably with an intermediate distillation step to purify the higher order silane product.

In accordance with another aspect of the invention, a plurality of discharge reactors are arranged in series to produce a higher order silane. A first discharge reactor produces a first silicon compound, which is fed to a downstream second reactor to produce a second silicon compound.

In the illustrated embodiment, monosilane is fed as a precursor to the first reactor, producing a high percentage of disilane, as well as byproduct and unreacted monosilane. The products of this reaction are fed to the second reactor, in which further monosilane can be separately provided. Reactions in the second reactor yield a higher percentage of trisilane, along with byproduct and unreacted disilane and monosilane. Desirably, conditions in the first reactor are optimized for disilane production, while conditions in the second reactor are optimized for trisilane production.

BRIEF DESCRIPTION OF THE DRAWINGS

These and other aspects of the invention will be readily apparent to the skilled artisan in view of the detailed description of preferred embodiments below and in view of the attached drawings, which are meant to illustrate and not to limit the invention, and in which.

DETAILED DESCRIPTION OF THE PREFERRED EMBODIMENTS

Figure 1:
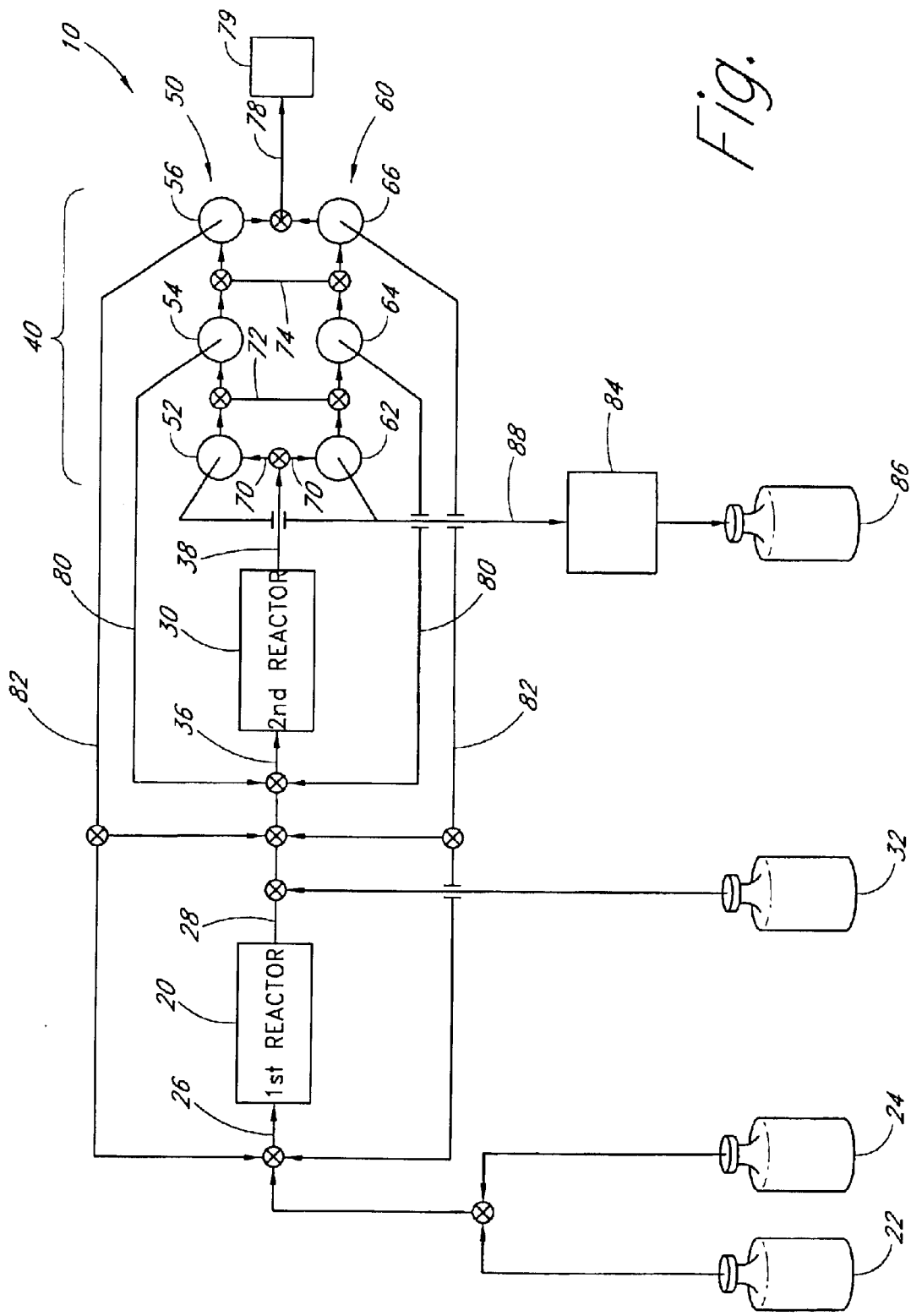
FIG. 1 is a schematic representation of an apparatus for producing higher order silanes and/or germanes in accordance with a preferred embodiment of the present invention.

The invention relates to the method and apparatus for synthesizing higher order chemical compounds from lower order precursors. The methods and apparatus disclosed herein are particularly effective at obtaining such higher order materials from inexpensive sources, such as monosilane and monogermane.

From the disclosures discussed in the "Background" section above, the skilled artisan will readily appreciate that it is possible, through routine experimentation, to optimize configuration and conditions in a corona or silent electric discharge reactor to obtain higher and lower relative amounts of particular products. For example, U.S. Pat. No. 5,505,913 describes silent electric discharge reactions optimized to yield disilane, while producing a very small percentage of trisilane. The disclosure of U.S. Pat. No. 5,505,913 (hereinafter "the '913 patent") is incorporated herein by reference.

In view of the present disclosure, the skilled artisan will appreciate that reactions can instead be arranged to optimize production of trisilane from monosilane in a reactor such as that provided by the '913 patent. Accordingly, in one embodiment of the present invention, a single discharge reactor (see FIG. 2) can be employed in conjunction with downstream condensation traps configured to isolate higher order silanes from lower order silanes such as disilane and monosilane. Desirably, lower order silanes can be periodically recycled into the reactions, using altered conditions for the recycle phase of operation, in recognition of disilane provided to the reaction. Such optimization, however, would still have a low trisilane yield (e.g., on the order of 1–40%) relative to disilane, monosilane and particulate byproducts, at least in the primary phase of operation. The recycle phase can desirably produce a higher yield of trisilane (e.g., on the order of 50–95%).

More preferably, however, the illustrated embodiment employs a succession of silent electric discharge reactors whose effluent is continuously distilled through a series of condensation traps to isolate the pure components of the discharge reactions. The described apparatus facilitates recycling of unreacted monosilane and disilane or monogermane and digermane reactants, while allowing continuous production and isolation of higher order silanes and germanes, thus enabling an industrial scale, inexpensive synthetic approach. The resulting mixture(s) of higher order silanes and germanes are then collected and distilled using an apparatus that does not require heating of the thermally sensitive mixture(s) to yield pure, isolated higher order silanes and germanes that can be used in a variety of applications.

As used herein, "higher order silane" refers to silicon compounds, and preferably inorganic silicon compounds, having three silicon atoms or more per molecule. "Higher order germane" refers to germanium compounds, and preferably inorganic germanium compounds, having two germanium atoms or more per molecule. While the preferred embodiments are described herein below with reference to higher order silane synthesis, the skilled artisan will appreciate that the principles and advantages described herein can readily be applied, in view of the present, disclosure to synthesis of higher order germanes.

Apparatus

Referring to FIG. 1, a chemical synthesis apparatus 10 is illustrated in accordance with a preferred embodiment of the invention. The apparatus 10 includes a first electric discharge reactor 20, with a precursor source 22 and an inert gas source 24 connected to an inlet 26 of the first reactor 20. An outlet 28 of the first reactor 20 communicates with a downstream second electric discharge reactor 30, which is illustrated as being connected with a supplemental precursor source 32. Each of the effluent from the first reactor 20 and the supplemental precursor source 32 are fed to an inlet 36 of the second reactor 30. Reaction products and byproduct of the second reactor 30 exit through an outlet 38, which leads to a plurality of condensation traps 40.

The plurality of downstream condensation traps 40 includes at least a first series of traps 50, which is shown with a first primary trap 52, a first secondary trap 54 and a first tertiary trap 56, connected in series by gas lines having valves therein. Desirably, each trap is kept at a sequentially lower temperature than the previous upstream trap, such that trap 52 is at a higher temperature than trap 54, and trap 54 is at a higher temperature than trap 56. Additional traps can be provided in the first series 50 if additional separation of effluent gases from the reactors 20, 30 is desired.

In the illustrated embodiment, the plurality of downstream condensation traps 40 also includes a second series of traps 60, including a second primary trap 62, a second secondary trap 64 and a second tertiary trap 66. The second series 60 is preferably configured as described above for the first series 50. Additional traps can be provided in the second series 60 if additional separation of effluent gases from the reactors 20, 30 is desired. A plurality of valves and shunt lines 70, 72, 74 are also provided to redirect gas flow among the first and second condensation traps 50, 60 when full, in accordance with the sequences described below. As will be appreciated in view of the processes described below, the multiple parallel traps 50, 60 promote efficiency by facilitating continuous operation and recycling of reactants.

The last of the condensation traps (traps 56 and 66 in the illustrated embodiment) are connected with an exhaust line 78, which leads to a scrubber 79 and final exhaust (not shown).

The contents of the condensation traps 40 must be periodically removed. Accordingly, each trap 40 can be configured for selective removal for opening and emptying the contents in a glove box, or with valves for removal of collected fluid. Preferably, at least the downstream secondary traps 54, 64 and tertiary traps 56, 66 include selective temperature controllers that can bring the temperature up above the boiling point of the condensed chemicals isolated therein. In one arrangement, these traps include a separate compartment to which collected fluid can be removed, and the separate compartment (e.g., gravitationally below the cold condensation walls) can be kept at or heated to a temperature above the boiling point of the trapped fluids, such that the cold trap walls need not be repeatedly heated and cooled.

Advantageously, the apparatus 10 is configured for recycling products and unreacted precursors from the reactors 20, 30. In the illustrated apparatus 10, for example, the downstream secondary and tertiary reactant traps 54, 64, 56, 66 are provided with feedback lines for recycling trapped chemicals. In particular, the secondary traps 54, 64 each include a secondary feedback line 80 leading from the traps 54, 64 (or the heating compartments thereof) to the inlet 36 of the second reactor 30. The tertiary traps 56, 66 also each include a feedback line 82, which communicates selectively with either the inlet 26 of the first reactor 20 or the inlet 36 of the second reactor 30.

The traps designated for collection of the chemical being synthesized are preferably also connected to a purification module 84, and thence to a chemical storage device 86. In the illustrated embodiment, the primary traps 52, 62 are provided with a collection line 88 for carrying collected fluid to the purification module 84. Typically, the purification module 84 distills the chemical of interest by vacuum distillation techniques employing another series of cryogenic traps designed to isolate and separate undesired reaction products from the chemical of interest.

Figure 2:
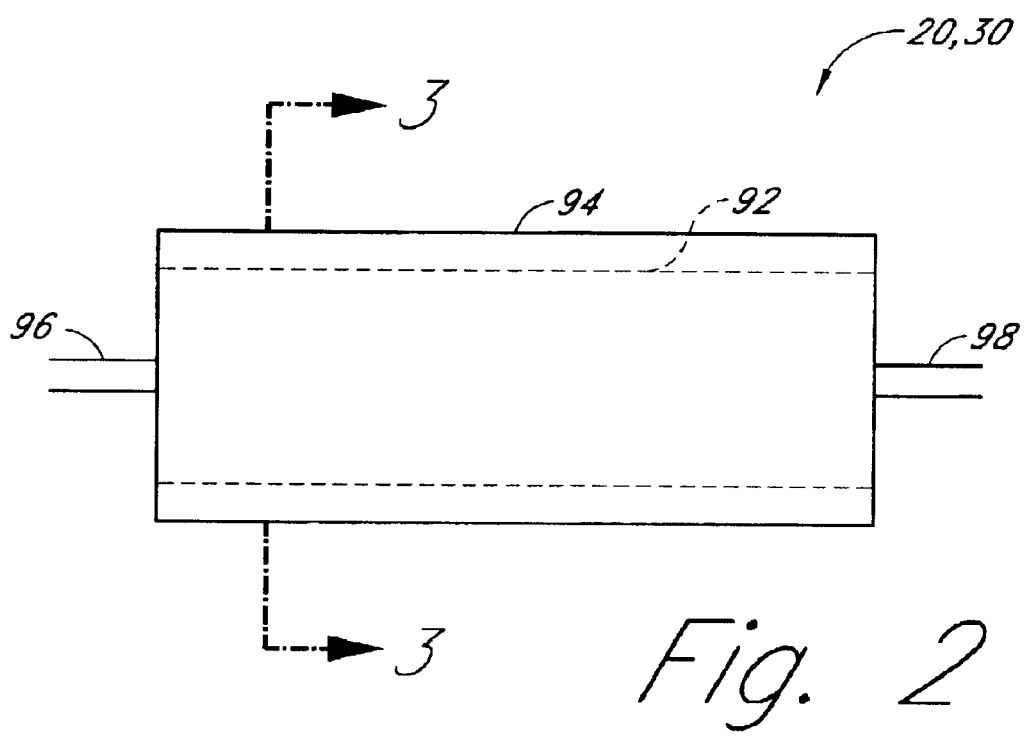
FIG. 2 is a schematic side view of a silent electric discharge reactor, constructed in accordance with the preferred embodiment.
Figure 3:
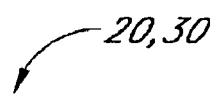
FIG. 3 is a schematic cross section taken along lines 3—3 of FIG. 2

FIGS. 2 and 3 illustrate a preferred configuration for the silent electric discharge reactors 20, 30. Note that the figure is schematic only and not drawn to scale. As shown and as described in the '913 patent, a reaction space 90 is defined between an inner cylinder 92, formed by a dielectric material with a metal coating, and an outer cylinder 94, made of metal. The axial length of the reactor can range between about 1 cm and 100 cm, and the overall diameter is preferably between about 3 cm and 7 cm. The spacing between the inner cylinder 92 and the outer cylinder 94 is preferably between about 0.1 cm and 2.0 cm. Precursor and carrier gases are fed to the reaction space by an inlet 96, preferably with a manifold (not shown) configured to distribute the gases about the annular reaction space 90, and exhausted through an outlet 98 with a similar manifold (not shown) for collecting exhaust from the annular reaction space 90. The skilled artisan will appreciate that the configuration is exemplary and that other configurations for silent electric discharge reactions are possible.

Methods of Operation

Figure 4:
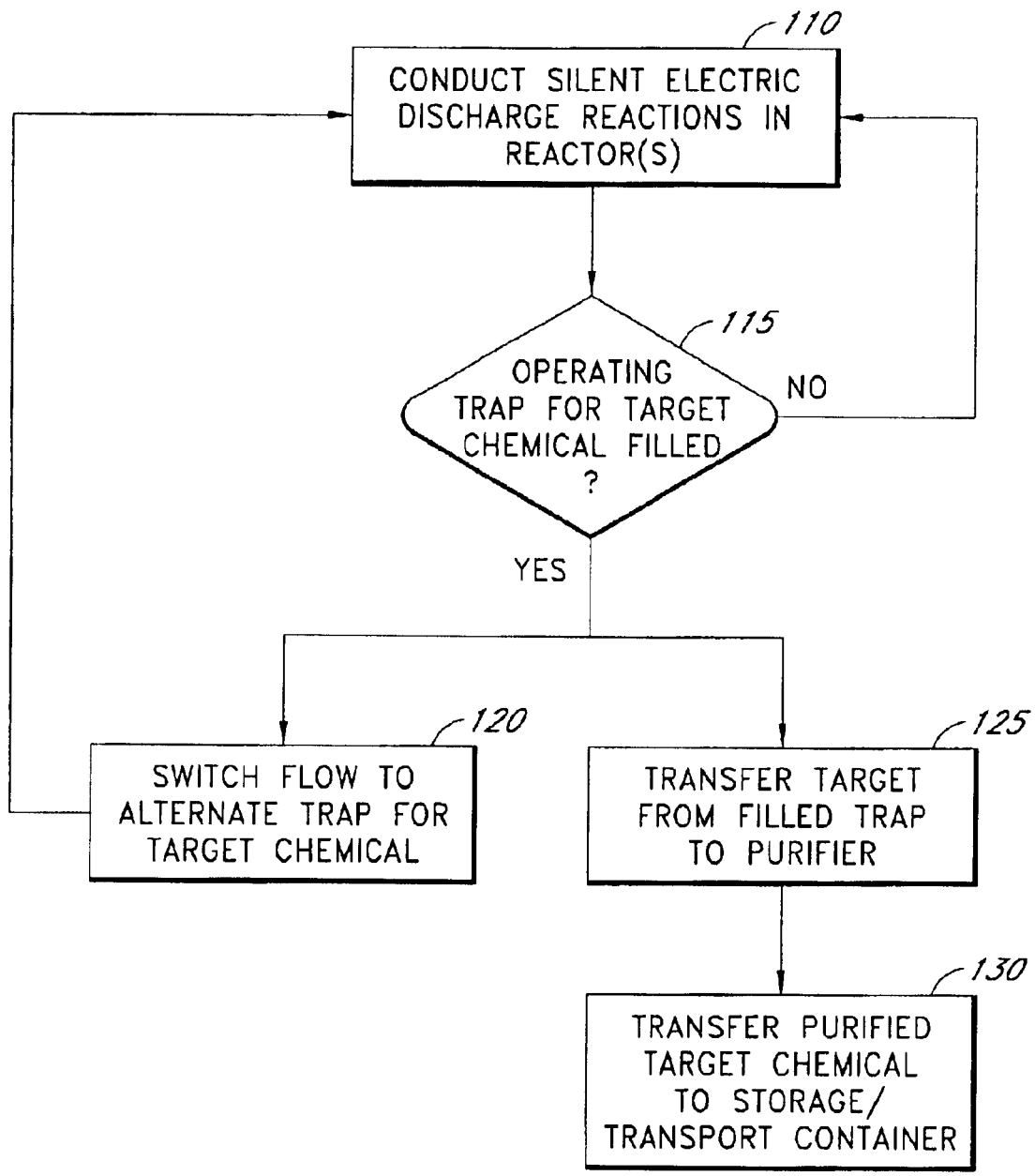
FIG. 4 is a flow chart illustrating a process for continuously collecting a chemical of interest during silent electric discharge synthesis.
Figure 5:
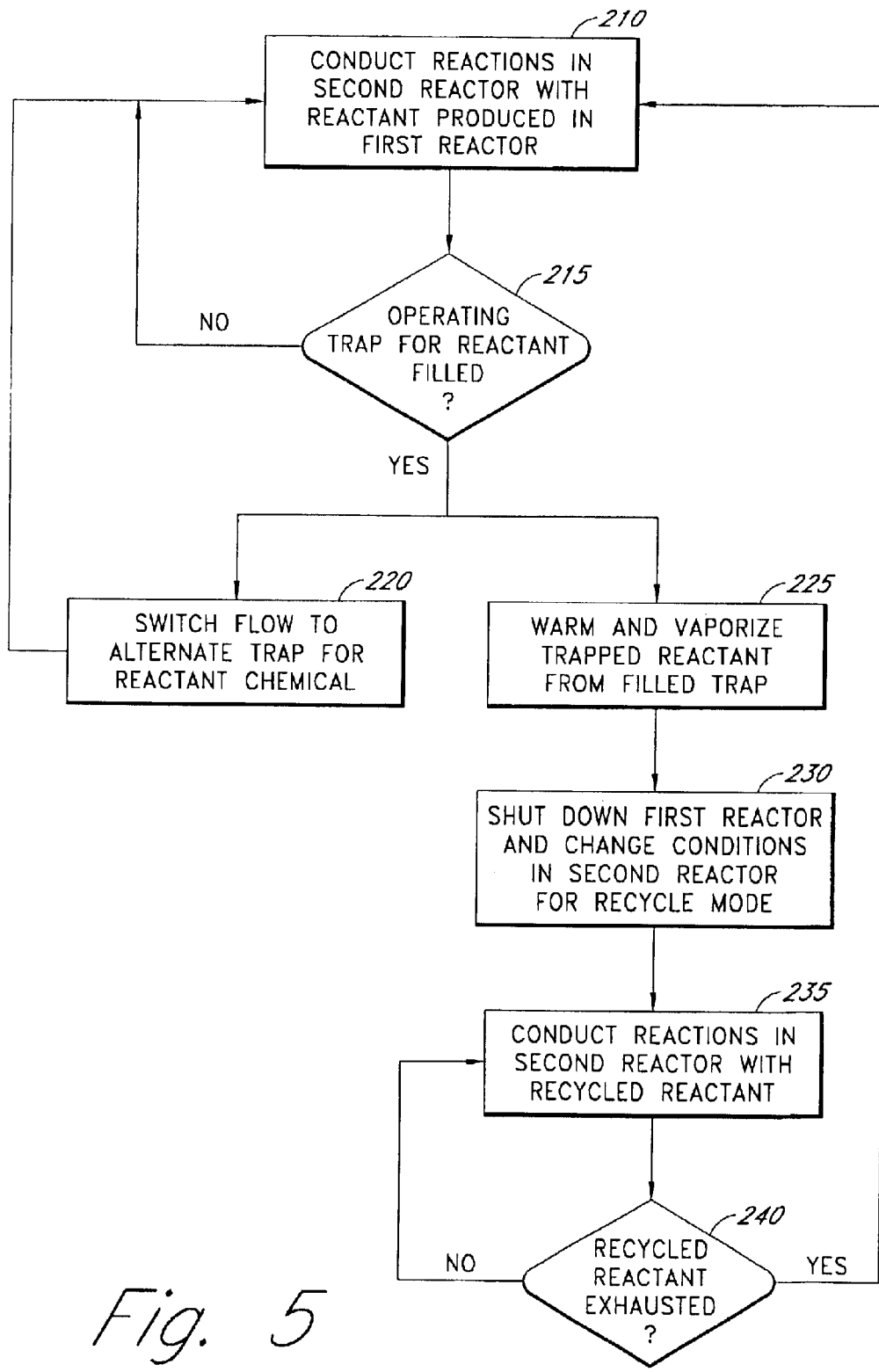
FIG. 5 is a flow chart illustrating a process for continuously synthesizing chemicals by silent electric discharge while periodically recycling reactants collected in a downstream condensation trap.

FIGS. 4 and 5 illustrate methods of conducting silent electric discharge synthesis reactions in a manner maximizing yield. In particular, the methods enable continuous operation and furthermore take advantage of recycling capabilities of the apparatus described above. The decisions and operation of the apparatus can be controlled manually or by a computer, including a memory device programmed or hardwired for operating in the fashion described below. The computer can operate in conjunction with various sensors, including sensors for determining when a condensation trap is filled, sensors for determining the temperature of the various traps, etc. Controls employed in operating the apparatus include valves, mass flow controllers (MFCs), heaters, coolers, power sources, vacuum pumps, etc.

Preferably, the reactors are operated at atmospheric pressure. Advantageously, atmospheric operation allows use of higher trap temperatures than vacuum operation will allow, due to the effectively higher vapor pressure of reactants and products under vacuum.

While continuous discharging can be employed, it is also preferred to employ pulsed discharged during the chemical synthesis. Advantageously, pulsed discharge (which has been employed in plasma deposition processes) entails better control over the final product. The duration, current frequency and power level can be independently controlled, providing better control over the energy input to the reactions. Optimization can therefore be better controlled.

FIG. 4 illustrates substantially continuous operation of a silent electric discharge device in the synthesis of a chemical. Initially, silent electric discharge reactions are conducted 110 in a reactor or reactors. An apparatus as illustrated in FIG. 1 can be employed. Reaction products are led to a series of cryogenic condensation traps, including a trap configured to trap the chemical of interest, referred to as the "target chemical" in FIG. 4. Once it is determined at decision box 115 that the trap for the target chemical is "filled" (i.e., filled to a predetermined level, e.g., 25% to 75% by volume), flow from the reactor(s) is switched 12- to an alternate condensation trap with the same or similar configuration (including temperature setting) for condensing the target chemical. While the alternated trap is operating, target chemical is transferred 125 from the filled trap to a purification module, such as the distillation apparatus 84 illustrated in FIG. 1 and described above. Purified target chemical is then transferred 130 to a storage/transport container. The emptied trap is then available for switching flow through it once the alternate (now operating) trap has been filled.

FIG. 5 illustrates the ability to recycle reactants for silent electric discharge reactions, particularly in the context of a dual reactor apparatus, in which an intermediate reactant is produced in an upstream reactor for use in a downstream reactor. The process further enables continuous operation, whether in "recycle mode" or "initial mode." In the initial mode, reactions are conducted 210 in a first reactor, producing intermediate product that serves as a reactant for use in the second reactor. Some such reactants react to produce the target chemical of interest, while other such reactants remain unreacted or recombined in the second reactor and are trapped in a downstream trap designed for this purpose. Once it is determined at decision box 215 that this reactant trap is filled, the flow from the reactions can be switched 220 to an alternate reactant trap with the same or similar configuration (including temperature setting) for condensing the reactant chemical to be recycled. Dual reactor reactions can then be temporarily continued while the reactant in the filled trap is warmed 225 for vaporization. Once the trapped reactant is vaporized, it can be provided to the reactor(s) for further reactions. Because the reactant is provided in a relatively pure form, compared to the product of the first reactor, the first reactor can be shut down and conditions in the second reactor altered 230 to conditions optimized for use of the recycled reactant in the recycle mode. With optional additional reactants (e.g., supplemental source 32 in FIG. 1) supplied directly to the second reactor, or passively provided through the first reactor, reactions are conducted 235 in the second reactor using the recycled reactant. Once it is determined at decision box 240 that the recycled reactant from the trap is exhausted, dual reactor or initial mode operation can be resumed until such time as the alternate (now operating) trap is filled with the reactant, and the cycle continues.

Trisilane Production

The apparatus and methods described above will now be described more concretely in the context of a preferred embodiment in which trisilane ($Si_3H_8$) is produced from monosilane ($SiH_4$) reactant, employing an intermediate product disilane ($Si_2H_6$).

With reference to FIG. 1, a mixture of monosilane and an inert carrier gas (such as helium or argon), is passed into the first silent electric discharge reactor 20, preferably at or above atmospheric pressure. The mixture is then exposed to high frequency discharge, either continuous or pulsed, to dissociate a fraction of the monosilane (or monogermane) into reactive fragments that can then recombine to form higher order silanes and/or germanes. Conditions are desirably optimized to yield, initially, disilane as the primary higher order component. The effluent from the first reactor 20 is then fed to the inlet 36 of the second reactor 30, in conjunction with unreacted monosilane from the first reactor 20 and possibly additional monosilane from the supplemental precursor source 32 that is also fed to the inlet 36 of the second reactor 30. This new mixture, comprising disilane and monosilane, is then subjected to silent electric discharge (typically with operating conditions different from the first reactor 20) to yield trisilane as the primary product, as well as unreacted or recombined disilane and monosilane.

The trisilane, disilane, monosilane and carrier gas is then passed through the series of condensation traps 40, which are cooled to appropriate temperatures to distill each of the components into its nearly pure form. In the preferred embodiment, the primary traps 52, 62 are set to temperatures selected to retain trisilane and higher order silanes, the secondary traps 54, 64 are set to temperatures selected to retain disilane and the tertiary traps 56, 66 are set to temperatures selected to retain monosilane. The carrier gas is then passed through the scrubber system 79 to remove any trace silane impurities and, finally, exhausted through an appropriate manifold.

The process described above continues until a sufficient volume of disilane and monosilane have collected in the condensation traps 54, 64, 56, 66 to warrant the recycling of these materials. The recycling is accomplished by allowing the condensed materials to warm and then passing the vapor phase materials to the appropriate reactor inlet using a mass flow controller. The carrier gas and optionally monosilane is fed through the first reactor 20 and then into the second reactor 30, as before. The first reactor 20 can be turned on to produce disilane, as before, but is preferably inactive while carrier gas and optional silane flows passively therethrough. Disilane recovered from the secondary trap 54 or 64 is fed (via feedback line 80) to the inlet 36 of the second reactor 30, while monosilane is fed either through the first reactor inlet 26 or the second reactor inlet 36. This recycling mode enables the synthesis of larger quantities of trisilane more efficiently due to the use of pure disilane, relative to the disilane/monosilane mixture provided by the first reactor. During this recycle mode of operation, control over the supply of disilane from its "pure" source 54 or 64 advantageously provides another variable and thus greater control over the optimization of trisilane production in the second reactor 30.

During the recycling of condensed disilane from first secondary condensation trap 54, the reactor effluent is advantageously fed to the second secondary condensation trap 64, connected in parallel to the first trap 54, and vice versa. Similarly, when monosilane from the first tertiary condensation trap 56 is being recycled through either the first reactor 20 or the second reactor 30, the effluent from the second reactor 30 is advantageously fed to the second tertiary condensation trap 66, and vice versa. Thus, recycling of collected reactants that can serve as precursors is possible while maintaining continuous operation.

When a sufficient quantity of higher order silanes, predominantly trisilane, has been collected in the first primary condensation trap 52, the reactor effluent is then passed through the second primary condensation trap 62 to allow continuous, uninterrupted production of trisilane. The contents of the first primary condensation trap 52 are then removed (either in the trap itself, by transfer to another container via an outlet valve or by direct transfer to the purification module 84 via an appropriately valved conductance) and distilled in-vacuo in the separate purification module 84 that is designed for this purpose to yield high purity trisilane.

In one arrangement, the condensation traps have volumes selected to match the different rates of production of the different products, such that all of the condensation traps on one line fill up substantially simultaneously. For example, if the initial mode of production (using only monosilane and the products of the first reactor directly in the second reactor) is employed until the first trisilane condensation trap fills up, desirably the sizes of the first disilane trap and the first monosilane trap are selected to substantially fill at the same time. Then the production flow can be shunted to the second series of condensation traps while the recycling mode of operation begins. Desirably, the sizes of the second condensation traps are selected to match the different relative production rates of the recycle mode, in which trisilane is produced at a relatively higher rate due to the higher percentage of disilane employed by the reactors from the first disilane condensation trap.

In another arrangement, the condensation traps are employed with a plurality of valves that shunt flow individually among the parallel condensation traps. Thus, for example, if the first monosilane trap 56 fills first, flow from the first disilane trap 54 is shunted to the second monosilane trap 66, while the first monosilane trap 56 is warmed for recycling. If the first disilane trap 54 fills next, valves are switched to shunt the flow from the first trisilane trap 52 (which has not yet filled, in the present example) to the second disilane trap 64, and then to the second monosilane trap 66. Thus, gas lines and valves are provided among the parallel condensation traps 50, 60 to allow continuous operation regardless of which traps are available for operation and which traps are being recycled or emptied for storage.

Control of the reaction products is a strong function of the reactor dimensions, method of operation and reaction conditions. The residence time of the reactants is particularly important for continuous discharge reactions (prior art). Use of pulsed discharge synthesis techniques represents a completely unique method that may allow for a greatly improved synthetic process that is less sensitive to reactor dimensions (i.e., overall reactor length and electrode spacing). Important variables for the reactions will include, starting voltage, current frequency, total reactor pressure, applied voltage time (pulse duration), reactant partial pressure (different for each reactor/combination of reactants) and carrier gas (identity) and partial pressure. The skilled artisan can optimize these variables, depending upon the chosen reactor configuration and dimensions, to maximize disilane production in the first reactor 20 and trisilane production in the second reactor 30. Similarly, these variables can be separately optimized for production of trisilane in the initial mode and in the recycle mode.

The continuous production of trisilane (or other higher order polysilanes/polygermanes) from monosilane (or monogermane) can thus be realized. The final purity of the product can be easily controlled through the distillation process.

EXAMPLE

An exemplary apparatus and process is provided below for the production of trisilane from monosilane.

First Reactor: A 5 cm long concentric stainless steel tube with inner and outer walls separated by evacuated space, inner wall is grounded, serving as the outer electrode for the reactor. The evacuated space between the inner and outer stainless steel walls serves as thermal insulation. Within the inner stainless steel wall is another cylindrical element comprising alumina (or other suitable dielectric material) coated with a low work function metal (e.g., silver, tungsten, etc . . . ), connected to high frequency electric source via contact and conductor, also 5 cm in length. The inner stainless steel wall and the concentric metal-coated alumina cylinder (i.e., the electrodes) are spaced about 0.1 cm apart, defining the reaction space therebetween. A conduit is provided for feeding reactants to the volume present between the two electrodes and a conduit is provided for feeding the reactor effluent to the second reactor. Optimal lengths/spacing to maximize production of the desired product can be determined empirically through routine experimentation.

Second Reactor: Same as the first reactor, but the electrodes are 4 cm long and spaced 0.08 cm apart. Optimal lengths/spacing can again be determined empirically through routine experimentation. A conduit is provided for introducing effluent from the second reactor into the downstream condensation traps.

$SiH_4$ (1–20% by volume, preferably 1–10% by volume, optimized to prevent voltage breakdowns that may damage the apparatus) and helium (argon, krypton, etc . . . ) (preferably 80–99% by volume, more preferably 90–99%) are introduced into the first reactor at a total pressure preferably between about 0.75 atmosphere and 2.0 atmosphere, more preferably about 1.2 atmosphere. The voltage source is then pulsed (pulse on preferably 0.1 msec to 0.5 sec, pulse off preferably 0.99 msec to 0.5 sec) at a fixed input frequency of (preferably 1–20 kHz, more preferably 1–10 kHz) in order to generate reactive fragments that can recombine to form disilane and hydrogen.

Proposed reaction:

$$SiH_4 + electrons \rightarrow Si_2H_6 + H_2 \text{ (+unreacted } SiH_4 \text{ and other byproduct)}$$

The reactor dimensions, total pressure, input frequency, pulse time and reactant partial pressures can be empirically optimized to maximize the yield of disilane in the first reactor.

The reactor effluent from the first reactor is then fed to the inlet of the second reactor and additional silane, if desired, is combined with the effluent at the inlet of the second reactor at a total pressure of about 1.2 atmosphere. The voltage source of the second reactor is then pulsed (pulse on preferably 0.1 msec to 0.5 sec, pulse off preferably 0.99 msec to 0.5 sec) at a fixed input frequency of (preferably 1–20 kHz, more preferably 1–10 kHz) in order to generate reactive fragments that can recombine to form trisilane and hydrogen.

Proposed reaction:

$$Si_2H_6 + SiH_4 + electrons \rightarrow Si_3H_8 + H_2 \text{ (+unreacted/recombined } SiH_4, Si_2H_6 \text{ and other byproduct)}$$

The effluent from the second reactor is then introduced into the first series of condensation traps. The primary trap is maintained at a temperature of −20° C. to −60° C. (fixed, optimal temperature to be determined empirically) to collect the trisilane produced while allowing the carrier gas, disilane, silane and hydrogen to pass through. The secondary trap is maintained at a temperature of −80° C. to −130° C. (fixed, optimal temperature to be determined empirically) to collect disilane while allowing the carrier gas, silane and hydrogen to pass. The tertiary trap is maintained at a temperature of −140° C. or lower to collect silane while allowing the carrier gas and hydrogen to pass to the scrubber and, eventually, to be vented through an appropriate manifold.

The reactor is operated in this fashion until the volume of collected disilane and silane in the condensation traps is sufficient to warrant emptying them (e.g., ½ to ¾ full). At this point, the effluent of the second reactor is then directed through the first primary (trisilane) trap, but then diverted to the second secondary (disilane) and tertiary (silane) traps. The isolated first disilane trap is allowed to warm to a temperature above the boiling point of disilane (while the temperature of the silane trap is maintained at −140° C. or less) during this operation. When the first disilane trap has warmed sufficiently, the disilane gas is then fed from this first disilane trap (or the warmer compartment thereof) to the inlet of the second reactor using a mass flow controller and a conduit.

At this time, the first reactor is turned off (except for carrier gas flow). The reactor conditions (total pressure, silane partial pressure, disilane partial pressure, frequency of electric current, pulse time, etc . . . ) are then adjusted to maximize the yield of trisilane using the "pure" recycled disilane and silane as the starting reactants. The second reactor is then operated in this mode until all of the recycled disilane has been consumed. The first silane trap is then allowed to warm to a temperature above the boiling point of silane. During this period, the first and second reactors are operated in the initial mode to produce further trisilane, disilane, silane and hydrogen.

When the first silane trap has warmed sufficiently, the silane source at the inlet of the first reactor is shut down and the required flow is replaced with the recycled "pure" silane from the initial silane trap. Alternatively, the recycled silane could be introduced at the inlet of the second reactor and substituted for the supplemental silane introduced there (if any). Alternatively, it could be used to feed both inlets in order to consume it more rapidly. This mode of operation is continued until all of the silane in the first silane trap is consumed.

At this point, the silane source at the inlet of the first reactor is turned back on and the reactors are operated in the initial mode until the second series of condensation traps have filled sufficiently with silane and disilane to warrant their recycling.

At this point, the modes of operation for recycling described above are begun again, by passing the effluent of the second reactor through the first series of condensation traps. However, at this point, the first trisilane condensation trap is isolated and allowed to warm, while the effluent stream is passed through the second trisilane condensation trap.

While the reactor is still operating, the collected trisilane is then removed (either in the condensation trap, in a separate vessel, or through a suitable transferral method including vapor phase or liquid transfer) and then purified as described below.

As used herein, "initial mode" of operation means feeding silane into the first reactor with a carrier gas and introducing the effluent into the second reactor (with or without supplemental silane introduced at the inlet of the second reactor). This is to distinguish it from the "recycle mode" of operation involving the use of pure recycled disilane in which the partial pressure of disilane can be independently controlled to optimize the yield of trisilane. The overall reactions are similar, but the use of the recycled disilane enables a potentially superior synthetic approach, since the amount of disilane that can be introduced into the second reactor is now a more controlled, independent variable (rather than a less controllable product from discharge reactions in the the first reactor.

The collected trisilane is then purified using vacuum distillation methods as described below. The liquid trisilane is maintained at a constant temperature (on the order of about 0° C., but can be optimized) while the vapor phase material is passed through a series of traps maintained at temperatures sufficient to separate it from unwanted impurities. The vapor is passed through a series of traps preferably maintained at various temperatures: one trap at from about −10° C. to 0° C., more preferably about 0° C., to collect any silanes of higher order than trisilane produced through the reactions; another trap at preferably about −30° C. to −70° C., more preferably about −60° C. to collect trisilane; and another trap at preferably at about −196° C. to collect any residual disilane or silane. The actual trap temperatures can be empirically optimized to maximize the purity of the trisilane. Any residual disilane or silane may be recycled by feeding them to the appropriate reactor inlet or discarded in an appropriate fashion. Any silanes of higher order than trisilane may be collected and saved or further purified. The crude trisilane collected may be further distilled using appropriate vacuum distillation techniques until the desired overall purity is achieved.

This example is not meant to be all-inclusive. The method and apparatus described above can be modified slightly to synthesize a wide variety of chemicals by changing the operating conditions, the number of condensation traps, the chemical reactants introduced, their point of introduction, etc.

A similar procedure, perhaps involving a single reactor mode of operation can be used to produce disilane or digermane (with reactant introduction through the second reactor alone and carrier gas provided passively through the first reactor, which remains in idle mode).

Advantages

The apparatus and methods described herein enables the high volume synthesis of trisilane from inexpensive monosilane by virtue of the continuous nature of the reaction process enabled by the reactor design. It is efficient and capable of recycling all of the feedstock materials, as appropriate, and enables the synthesis of trisilane using disilane that is generated, trapped and recycled in-situ, thereby eliminating the inherent cost of purchasing disilane.

The preferred embodiments enable the synthesis and isolation of trisilane using an external condensation-trapping scheme that enables continuous reaction of the system without the need to stop production in order to collect the product. They also allow for the recycling of all desired components, greatly reducing associated chemical consumption costs.

The preferred embodiments also allow for the synthesis of higher order silanes beyond trisilane merely by adjusting the condensation trap temperature(s) and substituting different feedstock materials for silane/disilane (e.g., using trisilane as the starting point to synthesize tetrasilane from electric discharge reactions of trisilane and monosilane). Likewise, substituted higher order silanes, such as chloropolysilanes, can be synthesized by adding an appropriate chlorine source (such as $Cl_2$, HCl, $SiCl_4$, etc.).

Although the present invention has been described in terms of certain preferred embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention.

I claim:

1. A method of synthesizing silicon compounds, comprising:

feeding silicon precursors into an electric discharge reactor, wherein the silicon precursors are broken down and recombined to produce additional silane compounds, wherein the electric discharge reactor comprises two silent electric discharge reactors in series, an upstream one of the reactors being optimized to produce an intermediate product and a downstream one of the reactors being optimized to employ the intermediate product in producing another product;

feeding products of the electric discharge reactor to a downstream series of condensation traps, which recover a higher order silane in one trap and lower order silanes in at least one other trap; and periodically removing the higher order silane to a storage device.

2. The method of claim 1, further comprising periodically recovering the lower order silanes and recycling the recovered lower order silanes for further reactions producing the higher order silane.

3. The method of claim 1, wherein the series of condensation traps comprises a series of parallel condensation traps for each recovered silane.

4. The method of claim 3, further comprising recycling an intermediate product recovered from the first lower order silane condensation trap while continuing to condense an intermediate product recovered from a second lower order silane condensation trap, arranged in parallel with the first lower order silane condensation trap, from ongoing reactions in the electric discharge reactor.

5. The method of claim 1, wherein the higher order silane comprises trisilane and the lower order silanes comprising disilane and monosilane.

6. The method of claim 5, further comprising providing separate condensation traps for recovering trisilane, disilane and monosilane.

7. The method of claim 6, further comprising, once a first trisilane condensation trap has been sufficiently filled shunting flow from ongoing reactions in the electric discharge reactor to a second trisilane condensation trap, while products in the first trisilane condensation trap are removed to a storage device.

8. The method of claim 7, further comprising distilling to purify the trisilane after removing from the first trisilane condensation trap and prior to storing in the storage device.

9. A method of synthesizing silicon compounds, comprising:

feeding silicon precursors into an electric discharge reactor, wherein the silicon precursors are broken down and recombined to produce additional silane compounds;

feeding products of the reactor to a downstream series of condensation traps, which recover a higher order silane in one trap and lower order silanes in at least one other trap, wherein the higher order silane comprises trisilane and the lower order silanes comprise disilane and monosilane;

periodically removing the higher order silane to a storage device;

providing separate condensation traps for recovering trisilane, disilane and monosilane;

once a first trisilane condensation trap has been sufficiently filled, shunting flow from ongoing reactions in the reactor to a second trisilane condensation trap, while products in the first trisilane condensation trap are removed to the storage device; and distilling to purify the trisilane after removing from the first trisilane condensation trap and prior to storing in the storage device.

* * * * *

UNITED STATES PATENT AND TRADEMARK OFFICE
CERTIFICATE OF CORRECTION

| | | |
|---|---|---|
| PATENT NO. | : 6,858,196 B2 | Page 1 of 1 |
| APPLICATION NO. | : 10/197899 | |
| DATED | : February 22, 2005 | |
| INVENTOR(S) | : Michael A. Todd | |

It is certified that error appears in the above-identified patent and that said Letters Patent is hereby corrected as shown below:

In Column 13, Line 31, In Claim 5, delete "comprising" and insert -- comprise --, therefor.

In Column 14, Line 2, In Claim 7, after "filled" insert -- , --.

Signed and Sealed this

Twenty-sixth Day of December, 2006

JON W. DUDAS
*Director of the United States Patent and Trademark Office*